July 13, 1965

E. S. GREEN 3,193,970

PLANT CONTAINER

Filed July 2, 1963

INVENTOR.
EVERT S. GREEN
BY
Kenyon & Kenyon
ATTORNEYS

July 13, 1965  E. S. GREEN  3,193,970

PLANT CONTAINER

Filed July 2, 1963  2 Sheets-Sheet 2

INVENTOR.
EVERT S. GREEN
BY
Kenyon & Kenyon
ATTORNEYS

United States Patent Office 3,193,970
Patented July 13, 1965

3,193,970
PLANT CONTAINER
Evert S. Green, 14 Kenneth Ave., Bellmore, N.Y.
Filed July 2, 1963, Ser. No. 292,786
7 Claims. (Cl. 47—38.1)

This invention relates to a plant container and more particularly to a flowerpot having means to create optimum light and moisture conditions for the growth of plants and is a continuation-in-part of my application Serial No. 115,112, filed June 6, 1961, now abandoned.

Many devices have been used in an attempt to assure a continuous, controlled feed of water with or without nutrient to the roots of plants, particularly flowering plants. The fullest growth and flowering of plants such as African violets requires a moisture environment for the roots that is carefully controlled with minimum fluctuations. Devices used for this purpose, such as wicks, have been found to be impractical and to give unsatisfactory results. Other devices which have been more practical to assure a constant moisture environment have had the disadvantage of not providing a means of draining off moisture so that there would be a steady inflow of liquid to the soil or sand. A continuous flow of liquid is necessary where the liquid carries nutrient to the plant and is desirable in any case to remove stagnant water.

Some self-watering devices have the disadvantage of over watering the plant due to insufficient drainage and thus bringing the air level in the soil below the optimum. Other devices are not adaptable to a nutrient feed due to uncontrolled feed of water or nutrient and thus are limited to those situations where nutrient is supplied by the soil.

In addition to moisture and feed parameters, a major factor in the growth of plants is widely recognized to be sunlight. There appears, however, to be no serious attempt to simulate natural light conditions for the growth of houseplants.

Accordingly, it is a major object of this invention to provide a plant container which will optimize the most important parameters for the growth of plants, specifically those parameters of moisture, light and controlled nutrient feed.

A more specific object of this invention is to provide a plant container which can be used to assure constant soil moisture.

Another specific object of this invention is to provide an even distribution of moisture around the roots of the contained plant.

Still another specific object of the invention is to provide improved control over soil nutrient as well as moisture.

Yet another specific object of this invention is to afford improved means for providing natural light conditions to houseplants.

It is a further object of this invention to provide a continuous change of moisture.

It is still another object of the invention to provide a means for a continuous even feed of nutrient to the plant soil.

It is an important object of the invention to meet the above objects with a device that is flexible enough to be used with many different plants.

Briefly, the invention is a flowerpot type of container having a feed line, a drain, a refracting crystal overhead and a reservoir of water. The feed line introduces water and nutrient from outside to the soil at a controlled rate through capillary action. The drain lets liquid out to maintain a steady flow of water and nutrient through the soil and thus to the plant. The refracting crystal overhead deploys light to the plant in a fashion which stimulates growth and creates a much more natural light environment than is otherwise supplied to houseplants.

Further objects and a fuller understanding of the invention may be had by reference to the following description and claims taken in conjunction with the accompanying drawings, in which:

Figure 1:
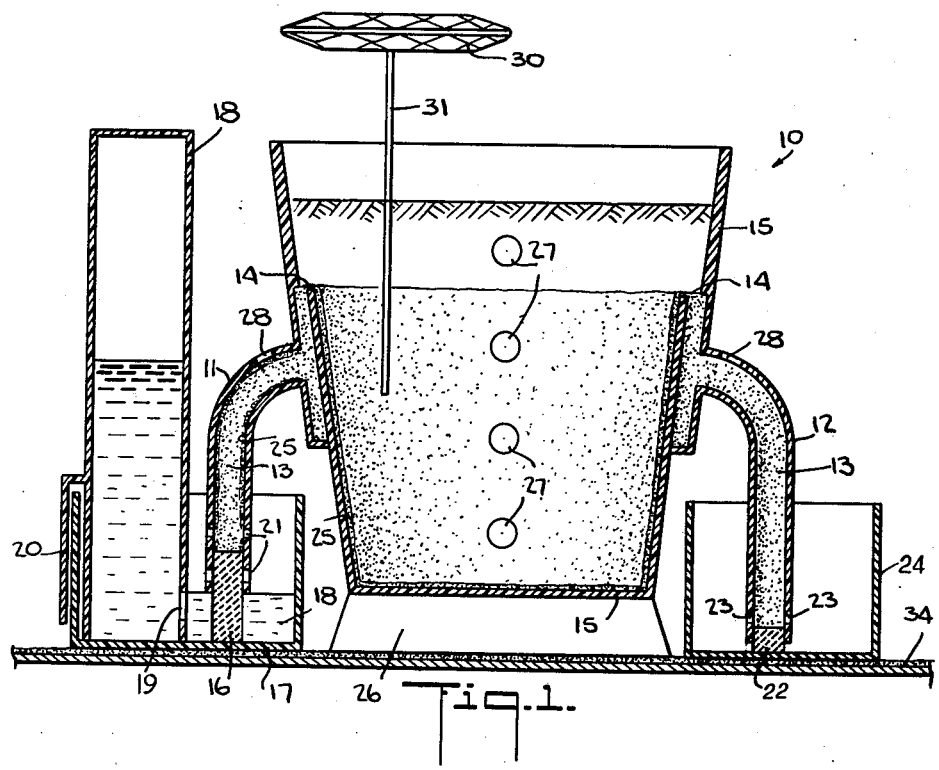
FIG. 1 is a cross-section elevation of a flowerpot embodying one embodiment of this invention.

With reference to FIG. 1, the plant container 10 has a feed line 11 and a drain line 12. Both of these lines are filled with a fine quartz sand 13 and communicate through this sand 13 with the interior of the container 10 by means of openings 14 in the container wall 15. The feed line 11 has an earthenware insert 16 at the end that dips into a reservoir 17 of water 18. The earthenware insert 16 absorbs water which then travels by capillary action up through the sand 13 in feed line 11 into the plant container 10. The earthenware insert 16 projects some distance below the end of the feed line 11 so as to present an adequate area for absorption of water. A one-quarter inch diameter insert 16 projecting seven-eighths of an inch below the feed line 11 has been found desirable for general use. However, the dimensions for any given application will depend on the porosity of the earthenware insert and the moisture requirements of the plants. The design of this invention is such that there is nothing very critical about the insert 16 because the water intake to the container 10 can be varied as desired through the control of the water level in the reservoir 17.

For a constant moisture feed to the container 10, it is necessary to keep the reservoir 17 level constant. One means of doing this is illustrated in FIG. 1 by the water tower 18. An opening 19 in the water tower 18 at the desired reservoir 17 water level will maintain that water level as long as the water in the tower 18 lasts. Thus, a very steady moisture flow into the container 10 can be maintained. If a different rate of flow is desired, a water tower with a different opening level may be used. For reasons of stability, the water tower 18 is clipped fast onto the reservoir 17 by a clip 20.

Plant roots require some air for the best development and fastest growth of the plant. In very wet and clay-like soils, this lack of air can drown a plant. This is one of the reasons why for most applications of the invention it is preferable, if not necessary, to use a sandy soil. However, to assure trouble-free operation by the plant siphon, small holes 21 are arranged around the circumference of the feed line 11 above the water level to act as air vents. The holes 21 allow trapped air to escape as the liquid rises in the feed line 11 through the sand 13. The description has referred to the reservoir liquid as water 18, but it should be understood that in most applications a nutrient is dissolved in the water 18 so that the feed line supplies water and nutrient to the soil and roots of the plant.

For most applications, water evaporation from the soil and plant leaves is not enough to maintain the desired moisture flow. Therefore, the container 10 is supplied with a drain line 12 filled with sand 13. The sand 13 in drain line 12 extends a point below that of the surface of the reservoir water 18 so that the moisture drain, if over-watering should occur, operates on the principle of a siphon. A small earthenware plug 22 must be set in the end of the drain line 12 to keep the sand 13 from falling out. To facilitate the drain of moisture or escape of air, small holes 23 near the end of the drain line 12, but above the plug 22, communicate with the sand 13 to allow moisture runoff into the sink 24.

Normally, the soil used with plants that benefit from such a moisture and nutrient flow is sufficiently sandy to maintain moisture flow between the feed line 11 and the drain line 12. However, to assure proper moisture flow, it is preferable to coat the inside of the container with a thin layer of sand 25 which is bonded to the container walls 15. The sand layer 25 also permits factory test without having to use a soil fill. To maintain a movement of fresh water through all of the container 10 soil, the floor of the soil containing portion must be above openings 23 in the drain line. Thus, the container 10 has a base 26 which is high enough so that the inside bottom of the container 10 is above the openings 23 at the end of the drain line 12. The bonded sand is preferably fine quartz sand as its capillary qualities are such that it will distribute moisture all around the container 10 and assure an even moisture distribution within the container 10.

It is preferable that the container walls 15, including the feed and drain line walls, be made of a plastic material rather than earthenware so that the only moisture drain will be through the controlled process above described. Small earthenware disks 27 may be inserted in the container walls 15 as rough indicators of the liquid content. When dry, the disks 27 will be brown and will turn a deep red when in contact with liquid. In one useful embodiment, the disks 27 are about one-quarter inch in diameter, spaced one-half inch apart in small size containers to one inch apart in large containers.

A fine quartz sand 13 has been found excellent for producing the capillary effect needed to obtain proper irrigation. The sand may compact on standing in the feed line 11 and drain line 12, leaving an air space that would diminish the capillary effect. Two expedients are used to minimize this problem. One is that a thin layer of fine quartz sand 25 is bonded to the walls of the two lines 11, 12 so that there will always be some sand continuity and thus some moisture flow. A second expedient is to construct two holes 28, one at the top of each line 11, 12 so that sand can be added in case an air space is created. The holes 28 also serve as air vents for the sand in the feed line 11 and drain line 12.

A crystal prism 30 is mounted on a rod 31 to cause refraction of incident light and thus dispersion of the light to the upper leaves of the plant. A crystalline quartz sand carpet 34 laid out at the base 26 of the container complements the crystal 30 and supplies a refracted light to the lower leaves of the plant.

Figure 2:
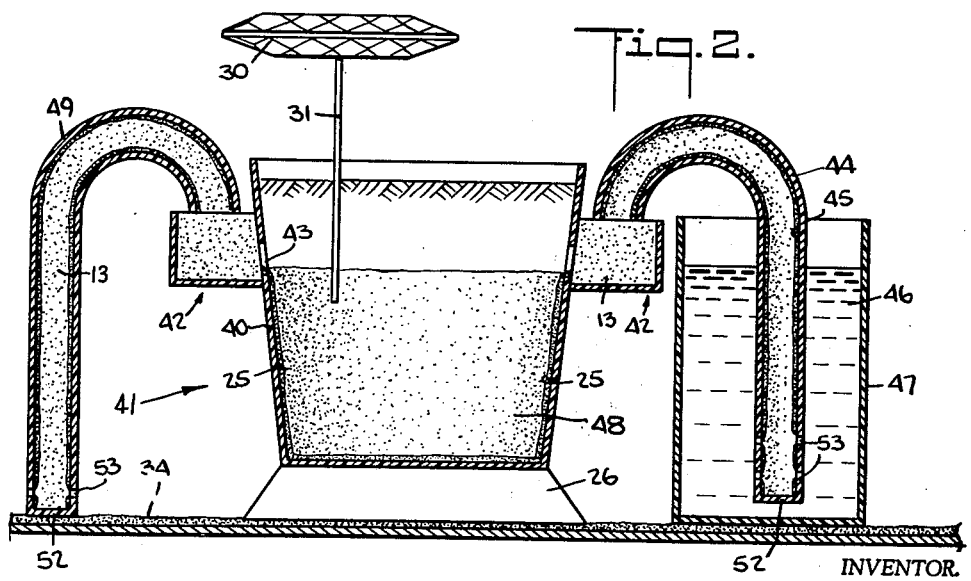
FIG. 2 is a cross-section elevation of an alternate embodiment of the invention.

Many applications of the basic invention may be made which will considerably alter the structure and looks of the embodiment without departing from the inventive combination of a controlled water, air and nutrient feed with a drain to maintain a steady moisture flow through the rots. FIG. 2 illustrates a variation that employs detachable fed and drain lines which may be removed for cleaning.

The plastic walled 40 container 41 has a sand 13 filled rim reservoir 42 with openings 43 communicating between the reservoir 42 and the coil in the container 41. A sand 13 packed feed line 44 with a sand bonded inner wall layer 45 is immersed in a water 46 or water plus nutrient reservoir 47 and by capillary action keeps the sand reservoir 42 saturated. The moisture enters the soil and plant cavity 48 to drain out through a drain line 49 packed with sand 13. A plug or closure 52 must be placed at the lower ends of both feed line 44 and drain line 49 to keep sand 13 in. However, a number of small holes 53 are made in the walls of both lines to permit liquid to pass in or out from the sand 13 within the lines.

As in the main embodiment described above, a thin layer of sand 25 is bonded to the inner walls 40 of the container 41. A base 26 maintains the container 41 above the level of the drain line 49 holes 53 to assure a proper siphon effect and avoid a stagnant pool of water near the base of the soil and plant cavity 48. The illustrated refracting crystal 30 and refracting sand carpet 34 operate as described in the main embodiment.

The main advantage of this second embodiment is that the drain line 49 and feed line 44 can be removed for cleaning. The sand 13 in the two lines 44, 49 is kept from falling out of the upper end by resting against the top surface of the sand 13 in the sand reservoir 42.

A water tower 18 as shown in FIG. 1 may be incorporated in the water reservoir 47 to maintain the water lever and thus the feed constant. Such water tower is not as important in this embodiment as in the embodiment of FIG. 1 since the sand reservoir 42 will stay pretty close to saturated over wide fluctuations in the water reservoir 47 level.

Figure 3:
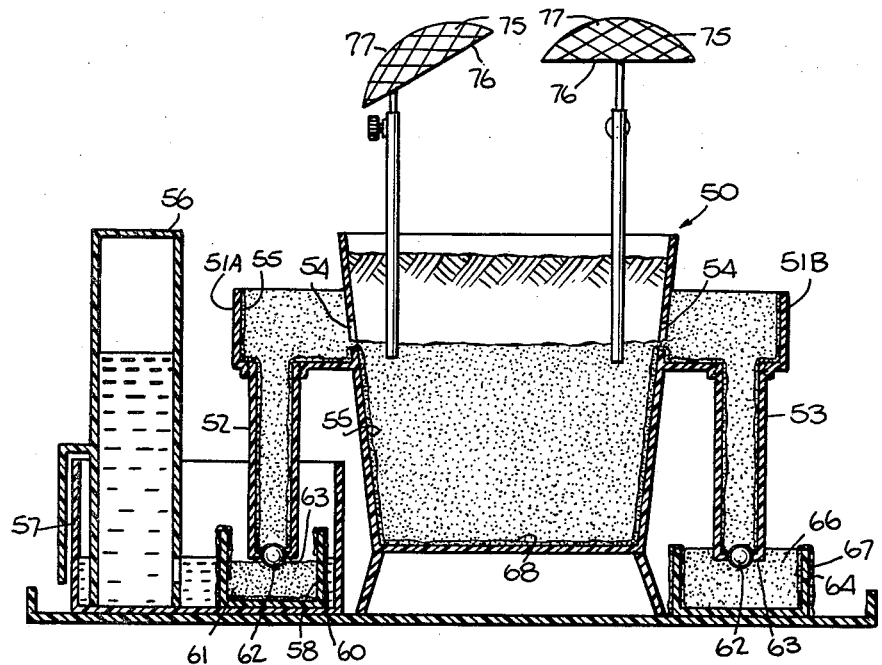
FIG. 3 is a cross-section elevation of a preferred embodiment of this invention.

FIG. 3 illustrates a preferred embodiment of this invention and thereby represents the conclusion of applicant's work in this field.

The main container 50 is shown with a rim reservoir 51. A feed line 52 and a drain line 53 are screwed into the base of the rim reservoir 51 and are spaced approximately 180° from each other. The feed line 52 and drain line 53 are filled with a fine quartz sand and communicate with the interior of the rim reservoir 51 which is also filled with a fine quartz sand. The rim reservoir 51 in turn communicates to the interior of the main plant container 50 by means of the openings 54. Capillary feed of water into and out of the soil containing portion of the main container 50 is enhanced and maintained by a quartz sand lining 55 which is bonded to the inside of the feed line 52, the main plant container 50, and the drain line 53.

A water tower 56 is used to maintain the desired water level in the reservoir 57. The feed line 52, instead of being directly inserted into the water in the reservoir 57, is inserted into a relatively small cap 58. The cap 58 sits in the water 59 and has a layer of fine quartz sand 60 bonded to its outside. Feed paths 65, which are strips of sand bonded to the inside wall of the cap 58 are connected to the bonded layer of sand 60. Thus water can flow by capillary action from the reservoir 57 up the sand layer 60, down the bonded sand feed path 65, and into the sand 61 which is contained in the cap 58. The feed line 52 contacts the sand 61 so that the water in the sand 61 can travel by capillary action up the feed line 52, into the sand of the first rim reservoir 51A, through the openings 54 and finally into the soil and plant containing main container 50. A ball 62 and flange 63 arrangement is used at the lower end of the feed line 52 to hold the sand in the feed line 52 when the main container 50 with its lines 52 and 53 is picked up under which conditions the ends of the lines 52 and 53 do not rest on the sand 61 and 66 respectively. Both the flange 63 and the ball 62 are bonded with a layer of fine quartz sand so as to assure a path for water flow between the ball 62 and the flange 63. In any case, since the feed line will normally be inserted into the sand 60 in the cap 58, the ball 62 will be pushed sufficiently far back into the feed line 52 so as to maintain adequate opening for the capillary flow of water.

The drain line 53 is substantially similar in construction to the feed line 52. It also contains a ball 62 and flange 63 arrangement for keeping the sand within the feed line 53 from falling out when removed for cleaning. In addition a drain line cap 64 containing sand 66 and a bonded layer of white sand 67 serves to provide the needed capillary continuity for drain of the water. To avoid a tendency for water to stagnate in the drain line cap 64 it is important that the water level in the reservoir 56 be maintained higher than the rim of the drain line cap 64. A second rim reservoir 51B covers the opening 54 and assures continuity of capillary drain from the interior of the main plant container 50 to the drain line 53.

When either feed line 52 or drain line 53 is removed, the flanges 63 hold the ball 62 from falling out and jointly keep the sand in the lines 52 or 53 from falling out. Thus the diameter of the ball 62 is great enough for it to be held by the flange 63.

The above described design of the feed line 52 and drain line 53 have certain advantages which cause them to be applicant's preferred design. Because the feed and drain lines 52 and 53 are screwed into the rim reservoirs 51, these lines 52, 53 are kept in secure communication with the rim reservoir 51 so that there is a continuity of sand within the lines 52, 53 and within the rim reservoir 51.

In addition, the feed and drain lines 52, 53 may be readily removed without moving the plants. Since the lines 52 and 53 may be removed without moving the plants, it also becomes possible to remove the reservoir 57 without moving the plants. Where large plant containers 50 are involved, there is considerable convenience in this ready removal of lines 52, 53 and reservoir 57 for cleaning purposes.

Figure 4:
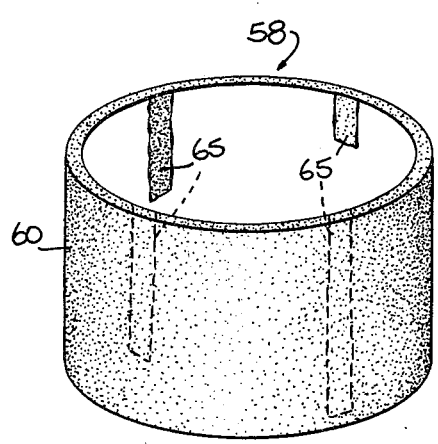
FIG. 4 is a perspective view of the cap closure which is used in conjunction with the FIG. 3 embodiment of this invention.

The design of the cap 58 shown in detail in FIG. 4 is important in this invention for controlling the rate at which water is fed to the main container 50. Water feed rate control is achieved by having a series of separate feed paths 65 on the inside walls of the cap 58. These feed paths are nothing more than fine quartz sand bonded onto the inside surface of the cap 58. The paths extend various distances down from the rim of the cap 58 to the inside base of the cap. This design is shown in perspective in FIG. 4.

The height of the sand 61 that is placed in the cap 58 will determine how many of these feed paths 65 will be contained in the continuous path of capillary flow of water. A small amount of sand in the cap 58 will cause only one of the feed paths 65 to be involved in the capillary flow of water and thus will involve the minimum flow of water. As the depth of sand 61 in the cap 58 is increased, two, three or four of the feed paths will be intercepted and the rate of water flow will correspondingly increase. In this fashion a very effective control over the rate of water flow is achieved and the planter of this invention can therefore be adapted to use with many types of plants which require different rates of water feed as well as with plants that require different rates of water feed at different periods in their life growth.

It is important to the proper operation of this invention that some attention be given to the characteristics of the sand which is bonded to such items as the feed line 52, the drain line 53 and the inside of the main plant and soil containing portion 50. This sand should exhibit strong capillary properties and accordingly fine quartz sand is preferred. It is important that the sand lining 55 maintain an appropriate flow of water and that it not hold the water. It is, after all, one of the main purposes of this invention to enhance the flow of water through the main plant container 50 so as to avoid an environment of stagnant water and so as to permit the carrying of nutrients with the water. For this reason, it is important that the drain line 53 be as carefully constructed as the feed line 52 so that water will drain from the planter. If water does not properly drain from the planter, water cannot flow into the planter to replace that which has drained out. It is thus also important that the drain line 53 terminate at some point below the inside base 68 of the main container 50 so that no pool of stagnant water will collect. For this reason a base 70 is provided as part of the main container 50 to make sure that the plant and soil containing portion is at all points above the drain line 53.

Figure 5:
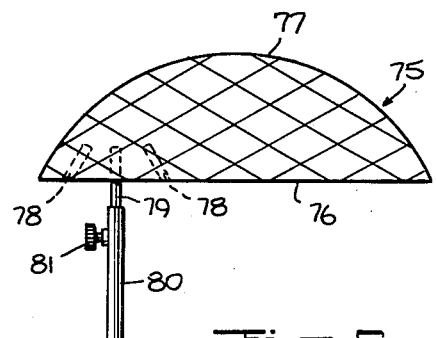
FIG. 5 is an elevation view of a crystal and its support as used in the FIG. 3 embodiment.

FIGS. 3 and 5 illustrate the preferred crystal 75 design. This preferred crystal design has a flat under surface 76 and a generally rounded, multi-faceted upper surface 77. This flat surface 76 can be held next to or on the leaves to be affected. Each crystal 75 has three small holes 78 cut at different angles into its bottom surface 76 so that the crystal may be tilted to whatever angle is preferable for assuring appropriate contact or proximity with the leaves. Each crystal 75 is held by a two part stem 79, 80, in which the upper part 79 fits into the lower part 80 and is held there by a small screw 81 so that the height of the crystal 75 may be adjusted to permit locating it as close as possible to a leaf.

The position of the crystal 75 as to both angle and height will, of course, have to change as the plant grows.

Although the invention has been described with a certain degree of particularity and three variants have been illustrated, it is to be understood that the present disclosure is by way of example and that changes in the details of construction and operation will be apparent to one skilled in the art and can be made without departing from the scope and claims of the invention.

For example, the relative dimensions shown in FIG. 3 are not necessarily accurate. The cross sectional size of the feed line 52 and drain line 53 are somewhat exaggerated so that their function can be more readily illustrated. For most household applications it has been found preferable to use a feed line 52 and drain line 53 which have an inside cross sectional diameter of approximately one-quarter of an inch.

I claim:

1. A plant container comprising:
   a soil and plant containing portion,
   a feed line having an upper end and a lower end, said upper end being in communication with said soil containing portion, said feed line containing sand enabling water to flow by capillary means to said soil and plant containing portion from said lower end of said feed line,
   a feed cap surrounding said lower end of said feed line, said cap containing sand in contact with the lower end of said feed line, said cap having a bonded sand layer along its inside and outside walls whereby a reservoir of water may be placed around said cap so that water will flow into said cap by capillary action and through said sand in said cap to said lower end of said feed line,
   a drain line having an upper end and a lower end, said upper end being in communication with said soil containing portion at a position opposite from said feed line, said drain line containing sand and enabling water to flow by capillary means from said soil and plant containing portion through said drain line to said lower end of said drain line, and
   a drain cap surrounding said lower end of said feed line, said drain cap containing sand in contact with said lower end of said feed line, said drain cap having a bonded sand layer on its inside and outside walls whereby water may flow by capillary action from said lower end of said feed line through said sand in said drain cap and along said bonded sand layer on said feed cap to a receptacle outside of said drain cap, the rim of said drain cap being lower than the rim of said feed cap.

2. The plant container of claim 1 further characterized by a bonded sand layer along the inside walls of said feed line, said soil and plant containing portion and said drain line, whereby a continuous layer of bonded sand is provided from the lower end of said feed line to the lower end of said drain line to enhance and assure a continuous flow of water through said container.

3. The plant container of claim 1 further characterized by ball and flange means at the lower ends of said feed line and said drain line for retaining said sand in said lines.

4. A plant container comprising:
   a soil and plant containing portion,
   a feed line having an upper end and a lower end, said upper end being in communication with said soil containing portion, said feed line containing sand enabling water to flow by capillary means to said soil and plant containing portion from said lower end of said feed line, a feed cap situated below and surrounding the lower end of said feed line, said feed cap having a bonded sand outside wall and a plurality of bonded sand paths along its inside wall, said sand paths extending from the rim of said cap in contact with said outside wall bonded sand and extending various lengths down into said cap, said feed cap containing a bed of sand in contact with at least one of said feed paths and with the lower end of said feed line to maintain a continuous capillary flow of liquid from outside said cap to said feed line, a drain line having an upper end and a lower end, said upper end being in communication with said soil containing portion at a position opposite from said feed line, said drain line containing sand enabling water to flow by capillary means from said soil and plant containing portion through said drain line to said lower end of said drain line, and a drain cap surrounding said lower end of said feed line, said drain cap containing sand in contact with said lower end of said feed line, said drain cap having a bonded sand layer on its inside and outside walls whereby water may flow by capillary action from said lower end of said feed line through said sand in said drain cap and along said bonded sand layer on said feed cap to a receptacle outside of said drain cap, the rim of said drain cap being lower than the rim of said feed cap.

5. The plant container of claim 4 further characterized by a bonded sand layer along the inside walls of said feed line, said soil and plant containing portion and said drain line, whereby a continuous layer of bonded sand is provided from the lower end of said feed line to the lower end of said drain line to enhance and assure a continuous flow of water through said container.

6. In a plant container wherein water is fed to and through said container by means of capillary flow into said container from a feed line, the improvement comprising:

a feed cap situated below and surrounding the lower end of said feed line, said feed cap having a bonded sand outside surface and a plurality of bonded sand paths along its inside surface, said sand paths extending from the rim of said cap in contact with said outside bonded sand and extending various lengths down into said cap, whereby sand placed in said cap will be in contact with at least one of said feed paths and with the lower end of said feed line to maintain a continuous capillary flow of liquid from outside said cap to said feed line, and whereby the height of sand in said feed cap will determine the number of said feed paths included in said capillary flow path so that the number of said feed paths included will partially determine the rate of water flow.

7. In a plant container wherein water is fed to and through said container by means of capillary flow into said container from a feed line, the improvement comprising:

a feed cap situated below and surrounding the lower end of said feed line, said feed cap having a bonded sand outside surface and a plurality of bonded sand paths along its inside surface, said sand paths extending from the rim of said cap in contact with said outside bonded sand and extending various lengths down into said cap, said feed cap containing a bed of sand in contact with at least one of said feed paths and with the lower end of said feed line to maintain a continuous capillary flow of liquid from outside said cap to said feed line, whereby the height of said bed of sand in said feed cap will determine the number of said feed paths included in said capillary flow path so that the number of said feed paths included will partially determine the rate of water flow.

References Cited by the Examiner

UNITED STATES PATENTS

| | | | |
|---|---|---|---|
| 705,372 | 7/02 | Androvette | 47—17 X |
| 1,580,287 | 4/26 | Colle et al. | 47—17 X |
| 1,584,632 | 5/26 | Merwarth et al. | 47—31 |
| 1,786,205 | 12/30 | Greider | 47—17 X |
| 1,814,339 | 7/31 | Sato | 47—29 |
| 1,953,363 | 4/34 | Pavlecka | 47—38.1 |
| 1,995,217 | 3/35 | Nelson | 47—38.1 |
| 2,063,901 | 12/36 | Wicander | 47—17 |
| 2,249,197 | 7/41 | Brundin | 47—1.2 |

FOREIGN PATENTS

| | | |
|---|---|---|
| 63,335 | 3/55 | France. |
| 335,788 | 4/21 | Germany. |
| 12,057 | 6/96 | Great Britain. |
| 720,949 | 12/54 | Great Britain. |

ANTONIO F. GUIDA, *Acting Primary Examiner.*

T. GRAHAM CRAVER, *Examiner.*